J. B. HURD.
KEY CONTROLLED VENDING MACHINE.
APPLICATION FILED JAN. 27, 1914.

1,152,638.

Patented Sept. 7, 1915.
5 SHEETS—SHEET 1.

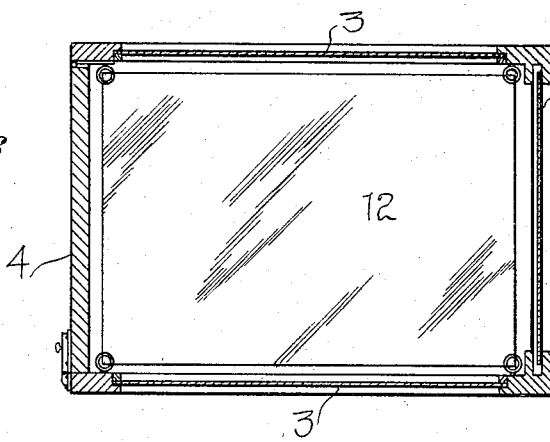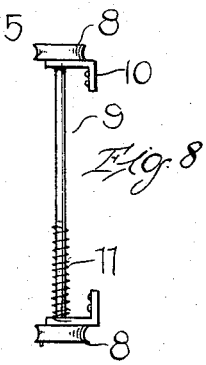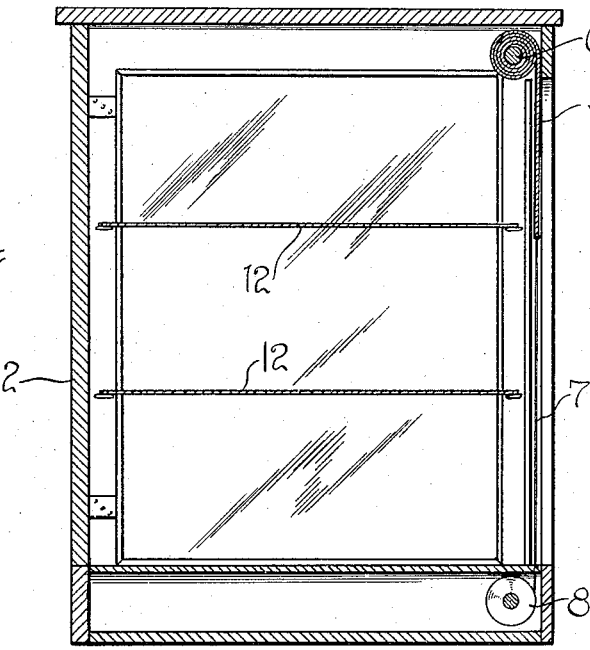

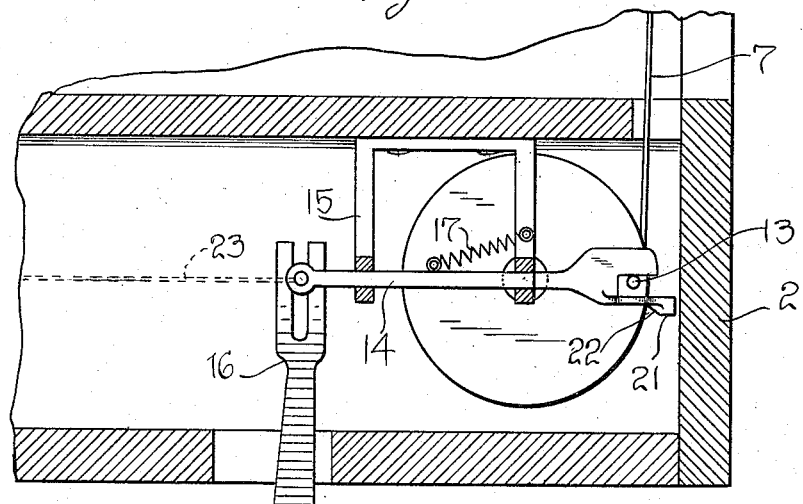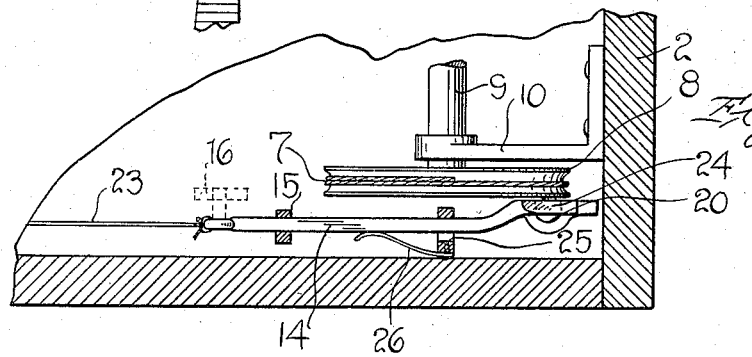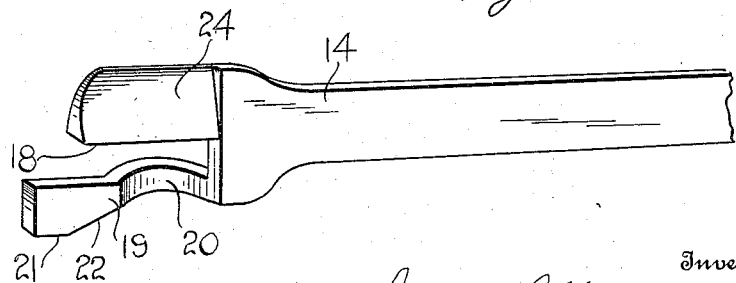

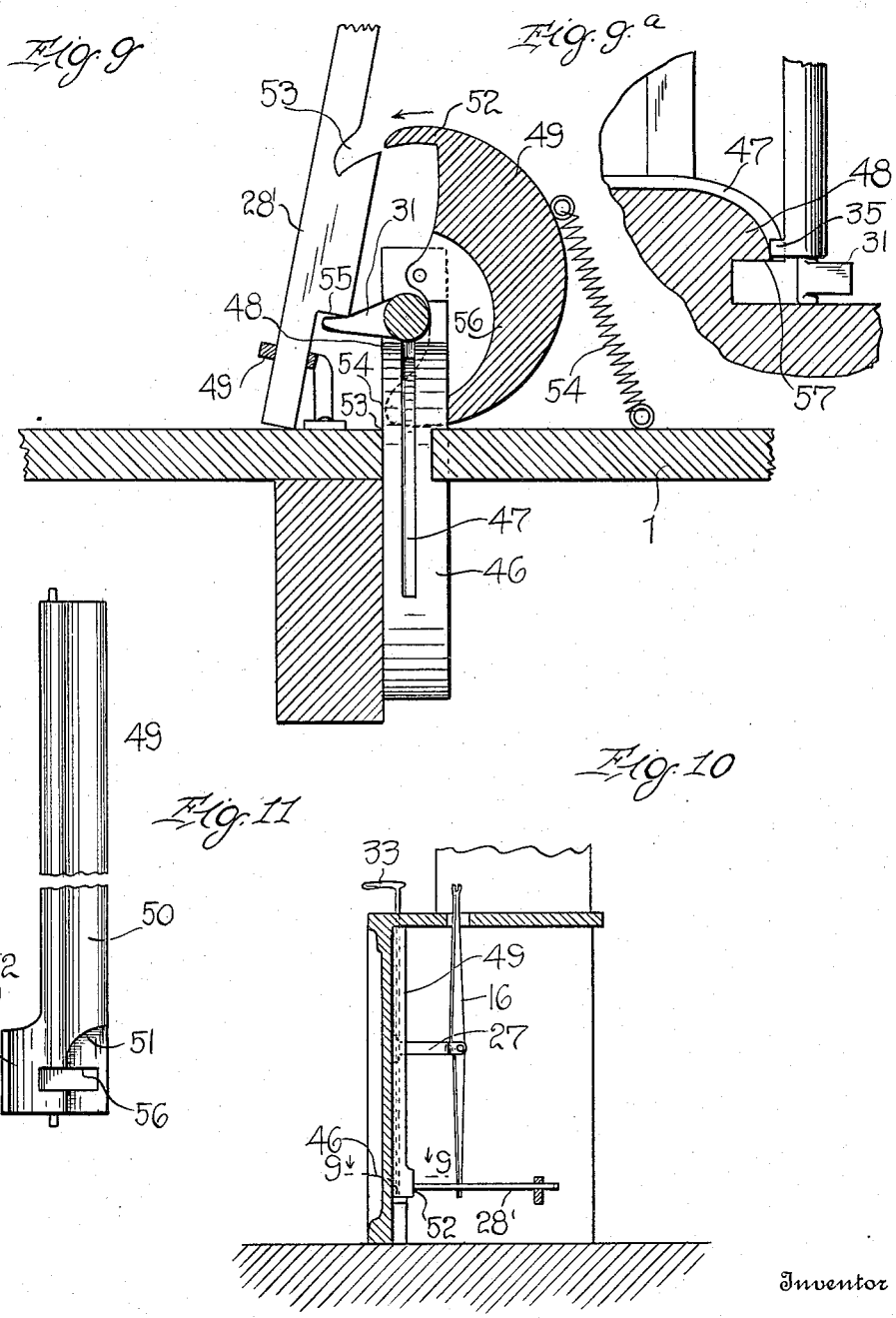

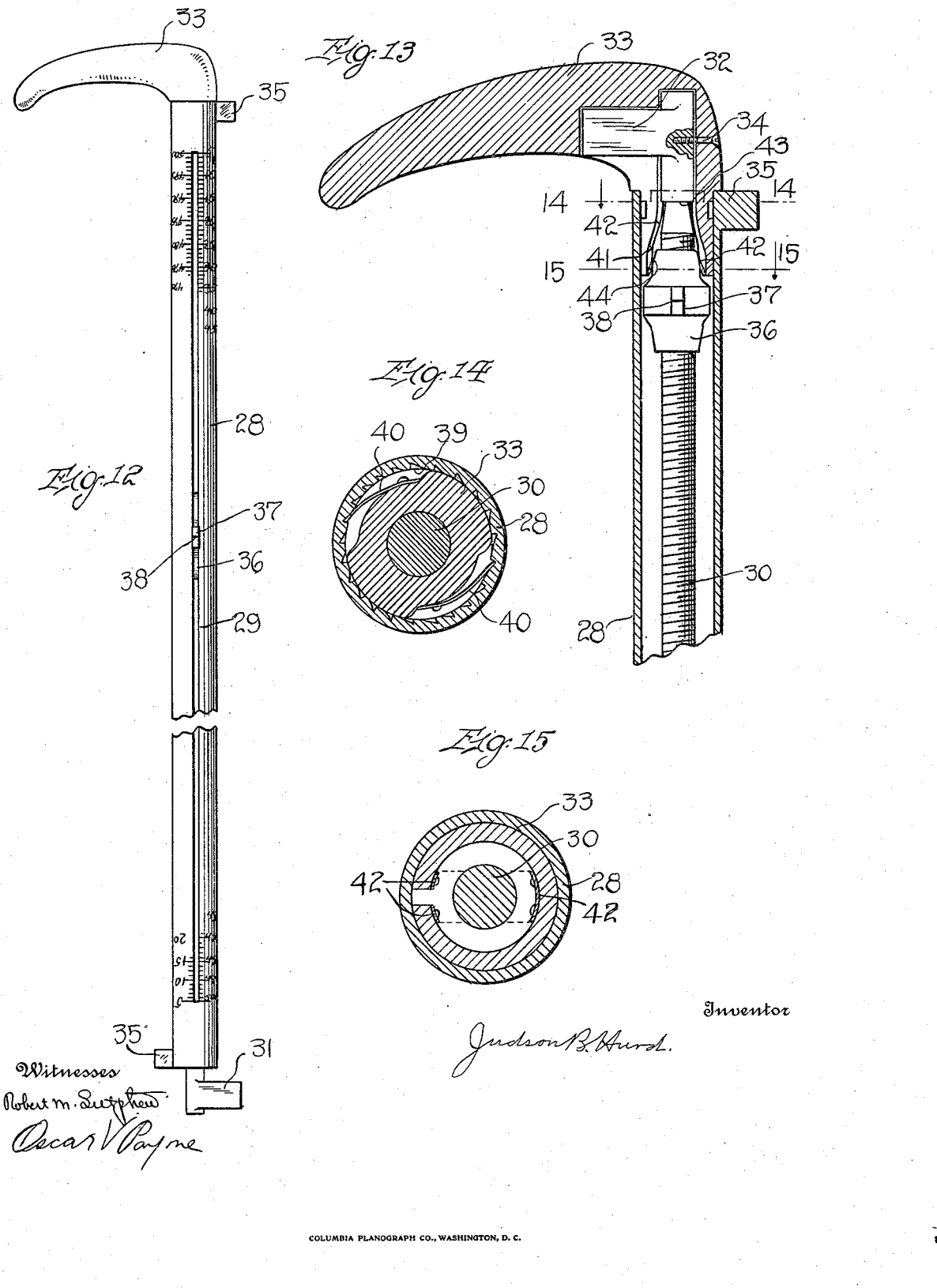

UNITED STATES PATENT OFFICE.

JUDSON B. HURD, OF WASHINGTON, DISTRICT OF COLUMBIA.

KEY-CONTROLLED VENDING-MACHINE.

1,152,638.  Specification of Letters Patent.  Patented Sept. 7, 1915.

Application filed January 27, 1914. Serial No. 814,846.

*To all whom it may concern:*

Be it known that I, JUDSON B. HURD, a citizen of the United States, residing in the city of Washington, in the District of Columbia, have invented certain new and useful Improvements in Key-Controlled Vending-Machines; and I do hereby declare the following to be a full, clear, and exact description of the invention, such as will enable others skilled in the art to which it appertains to make and use the same.

The present invention relates to vending machines and has for its object to provide a novel form of vending machine having key-controlled actuating mechanism.

The invention also contemplates the provision of a key adapted to control the actuating mechanism of the vending machine and having associated therewith, suitable indicating mechanism to register the number of actuations of the vending machine.

The vending machine is designed to receive and hold a plurality of articles which are successively released or vended when the machine is operated by the key. Each actuation of the key releases one article, and such actuation of the key is registered on the key itself. By this means, it is possible to provide purchasers with articles without the need of a salesman, and the usual selling system is improved in a number of other respects, as will hereinafter appear.

The purchaser, upon entering the store or other place where the vending machine might be located, is provided with one of the indicator keys, by the use of which, he may obtain as many articles as desired from the vending machines, but each article obtained will be registered upon the key. The attendant in charge may observe the indicating means on the key when the purchaser returns the same, and the purchaser may pay for the articles obtained accordingly.

The vending machine is so constructed as to guard against fraud and the key receiving mechanism is so designed as to necessitate the use of a relatively large key, preferably of the size of a walking cane. This precludes the possibility of the key being lost and makes it practically impossible for a purchaser to take one of the keys from the store without being noticed. Likewise, a false key cannot readily be brought into the store, nor can the key be readily imitated, since the size thereof precludes the possibility of obtaining an impression of the key, or otherwise copying the same, as would be possible with the use of a key of the ordinary size.

The invention is illustrated in the accompanying drawings, in which:—

Figure 1:
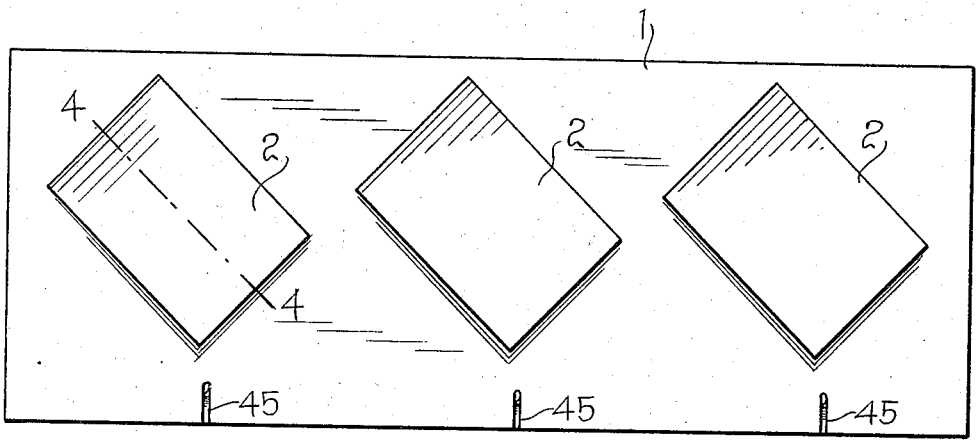
Figure 2:
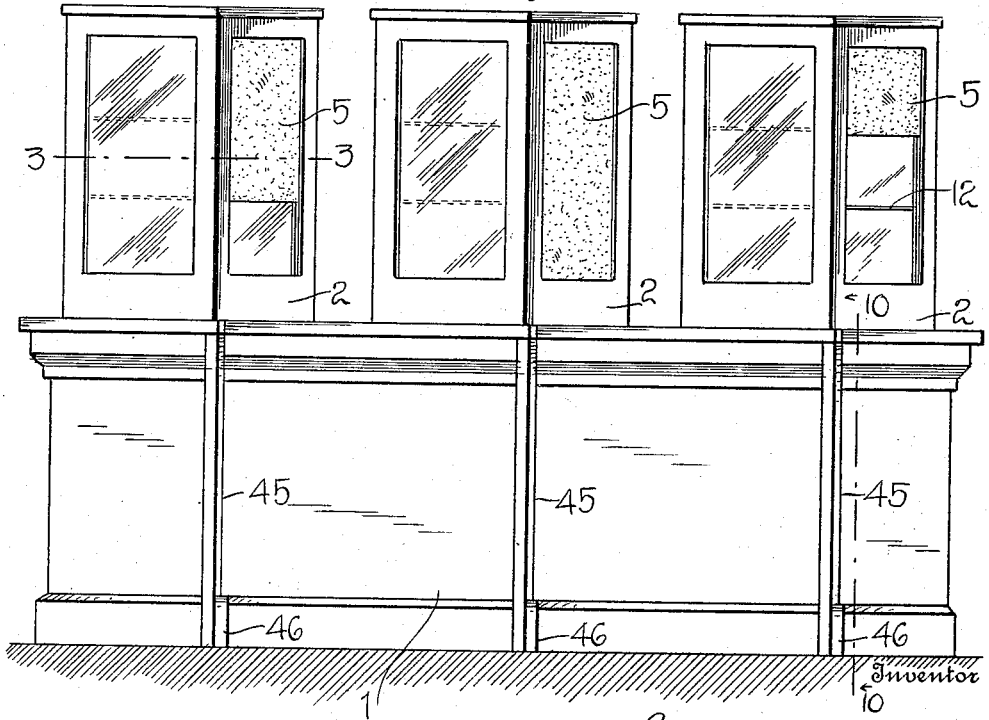

Figure 1 illustrates a top plan view of a dispensing or vending counter having thereon a plurality of cabinets in which the articles to be vended are positioned. Fig. 2 is a front elevation of the construction shown in Fig. 1. Fig. 3 is a transverse section of one of the cabinets shown in Fig. 2 taken on the line 3—3. Fig. 4 is a vertical section of one of the cabinets taken on the line 4—4 of Fig. 1. Fig. 5 is a broken detail view, partly in section, of a portion of the releasing mechanism for controlling access to the cabinet with which such releasing mechanism is associated. Fig. 6 is a top plan view of the construction shown in Fig. 5. Fig. 7 is a detail perspective view of the releasing lever associated with the mechanism of Figs. 5 and 6. Fig. 8 is a detail view showing the construction of certain pulley mechanism situated in the lower part of the cabinet. Fig. 9 is a transverse broken section taken on the line 9—9 of Fig. 10. Fig. 9$^a$ is a detail view showing the manner of inserting the key in its proper position with respect to the locking mechanism. Fig. 10 is a vertical section of the counter taken on the line 10—10 of Fig. 2. Fig. 11 is a detail elevation showing the construction of the guard or closure employed for automatically closing the opening through which the key is inserted. Fig. 12 is an elevation of the complete indicator key. Fig. 13 is a vertical section showing the interior construction of one extremity of the key. Fig. 14 is a transverse section of the key taken on line 14—14 of Fig. 13. Fig. 15 is a transverse section of the key taken on line 15—15 of Fig. 13.

Throughout the various views, similar reference characters refer to corresponding parts.

In the drawings, the numeral 1 indicates the counter or other suitable support for a plurality of vending or dispensing cabinets 2. Said cabinets are provided at their opposite sides with transparent portions 3, and at one of the remaining sides with a closure 4 to permit access to the interior of the cabinet. That side of the cabinet which is preferably opposite the closure 4 is provided with a closure 5, which, as hereinafter shown, is controlled by the releasing mechanism, which in turn is actuated by the indicator key. In the present instance, the closure 5 consists of a curtain wound upon a suitable roller 6 situated in the upper part of the cabinet. Any suitable spring mechanism may be employed tending to maintain the curtain in its rolled condition on the roller. Secured to the lower edge of the curtain of each cabinet are flexible cords or the like 7, each of which is wound upon a pulley 8, (Figs. 4 and 8) mounted upon a shaft 9, which in turn is mounted in the interior of the lower part of the cabinet by suitable brackets 10. A spring 11 is provided, which keeps the cords 7 and curtain 5 taut, but is not sufficiently strong to prevent the spring mechanism of the roller 6 from winding the curtain thereon when the pulleys 8 are released by the mechanism hereinafter described.

Each cabinet is provided with a series of shelves 12 upon which the articles to be vended are positioned. When the pulleys 8 are released, the curtain 5 is wound upon the roller 6 until the lower edge thereof rises a distance equal to the distance between the shelves, as hereinafter shown. Access is therefore permitted to a formerly closed compartment of the cabinet each time the pulley 8 is released.

Figs. 5 to 11 inclusive illustrate the mechanism for releasing the pulleys 8, the specific construction of which is not important, but, as shown, consists of a pin 13 carried by and projecting laterally from the face of one of the pulleys 8. The pulleys 8 are normally held against rotation by a slidable lever 14 mounted in a suitable bracket 15, and actuated by the pivoted link 16, to be hereinafter described. A spring 17, preferably interconnecting the lever 14, and the bracket 15, tends to hold the lever 14 in the position shown in Fig. 5, in which the pin 13 engages the edge 18 of the releasing lever 14. The outer end of the lever 14 is also provided with a projecting portion 19 having a curved bridge or clearance 20, through which the pin 13 is adapted to pass into engagement with the edge 18. The extremity of the projecting portion 19, however, lies in a plane immediately adjacent the pulley 8, so that it will be engaged by the pin 13 when said pin returns to its normal position after a rotation of the pulley. Due to this arrangement and construction of parts, it will be seen that when the lever 14 is moved to the left, in Fig. 5, by the link 16, the pin 13 will be released from the edge 18 and the pulley 8 will make a complete revolution, due to the fact that the curtain 5 is always tending to wind upon the roller 6. If the lever 14 returns to its normal position before the pin 13 returns to its starting point, said pin will pass beneath the bridge 20 and will abut against the edge 18, in which position it will be held until further released by an actuation of the lever 14. If, however, the lever 14 does not return to its normal position by the time the pin 13 returns to its starting point, the pin will contact with the edge 21 near the extreme end of the lever. As the lever approaches its final normal position, however, the pin 13 will ride down the inclined surface 22, then pass beneath the bridge 20 into its normal position in contacting relation with the edge 18. The parts are so proportioned that one revolution of the pulley 8 will permit the curtain 5 to rise a sufficient distance to permit access to the next higher shelf 12. The link 16 is intended to be actuated by the indicator key, but as it may sometimes be desirable to release the curtain 5 by hand, a cord 23 or other suitable connection may be secured to the lever 14 or link 16, and run to any suitable point from which it may be readily actuated. When the curtain 5 is in its highest position and it is desired to refill the cabinet, the curtain may be lowered by hand and the spring 11 will wind the cords 7 upon the pulleys 8. Under these conditions, however, the pulleys 8 will rotate in a reverse direction, and to permit the pin 13 to pass under the lever 14, the outer extremity of the lever is provided with an inclined or cam surface 24, which permits the pin to pass by the lever in the reverse direction of rotation of the pulley, but will not permit the pin 13 to pass in the other direction of rotation, due to the edge 18 which projects into closer proximity with the face of the pulley 8 than the edge opposite said edge 18. The pin 13, when passing beneath the lever 14 during reverse rotation of the pulley, will tend to shift the lever laterally and to permit this, a certain amount of play is permitted in the bracket 15, as indicated at 25, (Fig. 6). An appropriate leaf-spring 26 tends to hold the lever 14 in the position indicated in the drawings, but permits said lever to be shifted laterally by the passage of the pin 13 under the cam surface 24. In Fig. 10, the pivoted link 16 is shown, preferably located interiorly of the counter 1 and pivotally supported intermediate its ends by the bracket 27. The lower extremity of the link 16 is connected to a longitudinally slidable member 28′ adapted to be directly actuated by the indicator key. It will be noted that when the member 28′ is shifted longitudinally, the link 16 will be rocked about its pivot, thereby shifting the releasing lever 14 to produce the results hereinbefore described.

The indicator key for actuating the element 28′ is shown in Figs. 12 to 15, inclusive, and in the present form, consists of a tubular casing 28 provided with a longitudinal slot or opening 29. Journaled in the casing 28 is a threaded rod 30 carrying at its lower extremity the actuating element 31 which operates directly upon the locking mechanism. The upper end of the rod 30 is also provided with an actuating element 32 identical with that shown at 31, but a suitable handle 33 has been applied thereto and preferably secured in position by a screw 34. The tubular casing 28 is provided at each extremity with a projection 35 adapted to engage with a part of the counter, as hereinafter shown, to prevent rotation of the casing when the handle 33 is actuated to turn the rod 30.

The threaded rod 30 carries an interiorly threaded sleeve 36 having thereon a projection 37 adapted to engage in the slot-way 29 of the casing 28. It will be noted, that if the casing 28 be held against rotation and the handle 33 moved through one revolution, the rod 30 will be turned relatively to the casing 28, and the sleeve 36, which is held against rotation by the projection 37 engaging in the slot 29, will move vertically a certain distance, determined by the pitch of the threads on the rod 30. The casing 28 is suitably calibrated adjacent the slot 29, and a mark 38 provided on the projection 37 coöperates with the calibrations on the casing to indicate the number of times the handle 33 has been rotated. The calibrations may be so chosen with respect to the pitch of the threads on the rod 30 that one rotation of the handle 33 will cause the sleeve 36 to move a distance equal to the distance between the calibrations of the casing.

In order to prevent reverse rotation of the rod 30 relative to the casing 28, the latter is provided with internal ratchet teeth 39, and the lower part of the handle 33, which fits into the extremity of the casing 28, is provided with spring pawls 40, which engage with the teeth 39 and permit the handle and rod 30 carried thereby to rotate only in one direction relative to the outer casing.

It is also preferable to render it impossible to remove the handle 33 from the casing 28 until the sleeve 36 has reached the extreme end of the casing. The interior opening of the extremity of the handle 33 is, therefore, slightly enlarged, as shown at 41, and to the interior surface of such opening are secured leaf-springs 42. The free extremities of said springs tend to press inwardly and engage under a shoulder 43 provided on the rod 30. It will be noted that as the sleeve 36 reaches the extremity of the casing 28, a cam-like surface 44 provided on said sleeve engages the springs 42 and moves the same outwardly to release the extremities thereof from the shoulder 43. In this position of the springs, the screw 34 may be removed and the handle 33 disconnected from the rod 30. As both ends of the casing are identical, and as the actuating elements 31 and 32 are identical, the handle 33 may be applied to either end of the rod 30, so that when the sleeve 36 reaches one extremity of the casing, the handle 33 may be removed and transferred to the opposite end and the use of the key continued without any re-setting of the parts.

When a key as above described is used with a vending machine of the present type, the counter 1 is provided with vertical openings 45, Figs. 2 and 9, running from the top of the counter to a lower ledge 46. The said ledge 46 is provided on its upper edge with a slot or guide-way 47 in which the projection 35 of the key-casing is adapted to engage. The ledge 46 projects into the interior of the counter 1 and its inner end is inclined downwardly, as at 48, (Figs. 9 and 9ª). The extremity of the slidable rod 28' is slidably mounted in the bracket 49', preferably secured to the inner side of the front wall of the counter 1 and so positioned that the key, when positioned as shown in Fig. 9, may coöperate with the rod 28' to shift the same longitudinally.

The key is inserted by placing the lower extremity thereof adjacent the lower end of the opening 45 and resting the same on the ledge 46. By tilting the key bodily toward the operator, the projection 35 may be made to engage in the slot 47, and the key may then be slid into position by bodily moving the key toward the counter 1. The slot 47 will direct the movement of the lower end of the key through the vertical opening 45 in the counter. After the lower end of the key has passed through said opening in the counter, the key will ride down the incline 48 into the position shown in Fig. 9ª. The upper extremity of the key is then moved inwardly until the key assumes a vertical position entirely within the counter 1.

In order to prevent actuation of the releasing mechanism by unauthorized persons, a closure is provided for the opening 45 in the form of a member 49 pivoted at its upper and lower ends to the top and bottom of the counter, respectively, and running substantially the whole length of the key opening. The member 49 is provided with a projecting portion 50, which constitutes a closure or shutter for the opening 45, as shown by dotted lines in Fig. 9. The lower part of the projection 50 is cut away, as at 51, to accommodate the inner end of the ledge 46. The rear edge of the member 49 is provided with a projection or tooth 52, which engages in a coöperating opening 53 of the rod 28' when the member 49 is swung about its pivot in the direction indicated by the arrow in Fig. 9.

When the key is inserted, the actuating part or bit 31 thereof is forced between the edge 53 of the counter, and the projection 50 of the member 49. Due to the cam action between the part 31 and the edges 53 and 54, and a twisting movement which may be imparted to the part 31, the member 49 may be swung around its pivot in the direction of the arrow to uncover the opening 45. When the said opening 45 is so opened, the projection 52 engages in the opening 53 and prevents any longitudinal movement of the rod 28' until the member 49 has returned to its normal closed position. The member 49 will be returned to its normal position by means of the spring 54 after the key has assumed its final position entirely within the counter 1, because the key will then be clear of the projection 50 and will be accommodated by the interiorly recessed portion of the member 49, as best shown in Fig. 9. As the projection 52 always engages in the recess 53 when the shutter is open, it is obvious that the actuating mechanism cannot be operated by unauthorized persons when the shutter is held open. If a key, similar to that herein described, is not employed, the shutter will have to be held open during any attempts to actuate the rod 28'. The machine can, therefore, not be operated, except by the use of a key substantially like that herein disclosed. After the key has been so positioned, the turning of the handle thereof will cause the actuating part 31 of the key to engage with a suitable shoulder 55 provided on the rod 28', and said rod 28' will, therefore, be shifted longitudinally. It will be noted that a complete rotation of the element 31 is necessary before the key can be removed from its actuating position, since after the part 31 has passed the shoulder 55, the direction of rotation of the key cannot be reversed. A suitable cut-out portion 56 is provided in the member 49 to permit of the complete rotation of the element 31, and a clearance 57 is provided in the ledge 46 for the same purpose. After actuation of the releasing mechanism, the key may be removed by simply drawing the key toward the operator, and the cam action between the same and the edge 50 of the member 49 will swing the latter in the direction of the arrow, thereby uncovering the opening 45 and permitting the key to be bodily removed. The longitudinal movement of the rod 28' by the actuating element 31 of the key, swings the link 16 about its pivot, which in turn shifts the releasing lever 14 to permit the curtain 5 to rise, as hereinbefore described.

The indicator key, when used with a vending machine of the type described, enables a purchaser to obtain the article or articles he desires without the need of a salesman. The purchaser is provided with one of the indicator keys by an attendant, who notes the indication of the key when delivered to the purchaser. The purchaser, by using the key in the manner hereinbefore described, may obtain the articles he desires, but as a complete rotation of the key is necessary for each article, and as each of such rotations is indicated on the body of the key, the key will indicate the number of articles the purchaser has obtained. When the key is returned to the attendant, the number of articles purchased by the customer may be ascertained. The provision of the pawl and ratchet shown in Fig. 14 prevents reverse rotation of the handle 33, and thereby eliminates the possibility of a customer running the sleeve 36 backward and causing the indicator to read less than it should.

The use of a key constructed substantially as above described completely solves the problem of vending articles without a salesman. Many convenient and simple forms of apparatus have been devised to hold the articles on exhibition ready to be released to the customer, and the provision of a suitable key which releases one article at a time to the customer and registers each sale is obviously advantageous. It is desirable, however, to so construct the actuating mechanism and the opening into which the key is inserted that a key of sufficient size is required to eliminate the possibility of the key being lost in the salesroom, or the possibility of it being taken from the room without attracting the attention of the attendant in charge. A large key has the advantage of permitting the calibrations to be easily read and of permitting the indicating mechanism to be simply constructed so as to eliminate the possibility of error.

What I claim is:—

1. The combination with a vending machine having key-controlled actuating means, and an elongated opening, of a key to control said actuating means and having an elongated body portion adapted to be operatively positioned by lateral movement of the key through said opening.

2. A vending machine, comprising a counter, a cabinet associated therewith adapted to hold articles to be vended, means associated with said cabinet to successively release said articles, key-controlled actuating means for said last-named means, said counter having an elongated key opening, and a key adapted to be inserted through said opening into its operative position.

3. A vending machine, comprising a counter, a cabinet associated therewith adapted to hold articles to be vended, means associated with said cabinet to successively release said articles, key-controlled actuating means for said last-named means, said counter having an elongated key opening, and an elongated key adapted to be inserted laterally through said opening into its operative position.

4. A vending machine, comprising a container, a plurality of shelves positioned therein adapted to hold the articles to be vended, a curtain associated with the container and normally preventing access to said shelves, actuating means adapted to move at each actuation thereof, the curtain a predetermined amount to permit access to one of the shelves, and a key to control said actuating means.

5. A vending machine, comprising key-controlled mechanism for successively vending articles, a counter upon which said mechanism is positioned, said counter having a key opening therein in which a key may be inserted.

6. A vending machine, comprising key-controlled mechanism for successively vending articles, a base structure upon which said mechanism is supported, said base structure having an elongated key opening, for the purpose described.

7. The combination with a vending machine having key-controlled actuating mechanism and an elongated key opening associated therewith, of an elongated key having a bit at one end to control the actuating mechanism, and a handle at the other end accessible to the person actuating the machine when the key is positioned in said opening.

8. In a machine of the kind described, the combination of key-controlled vending mechanism, a base structure upon which said mechanism is supported, and having a key opening extending transversely across one side thereof, and a key adapted to be operatively positioned by moving the same laterally through said opening.

9. In a machine of the kind described, the combination of key-controlled vending mechanism having an elongated key opening, actuating means for the vending mechanism, means to control the actuating means and having a key-operated portion adjacent one end of said opening, and an elongated key adapted to be inserted through said opening and having a part to coöperate with said key-operated portion.

10. A key-controlled vending machine having a key-opening, a shutter normally closing said opening, and means to prevent actuation of the vending machine while the shutter is open.

11. A key-controlled vending machine having an elongated key opening through which a key may be moved laterally, a shutter normally closing said opening but adapted to be opened during positioning of the key and to close after the key is positioned, and means to prevent actuation of the vending machine while the shutter is open.

12. The combination with a key-controlled vending machine having actuating means controllable by a key at one point, and key-receiving means permitting a key to be actuated at a point remote from said first-named point, of a key having one portion to control the actuating means and a relatively long body portion adapted when the key is positioned in the key-receiving means to extend to the second-named point.

13. The combination with a key-controlled vending machine, of a reversible indicator key therefor.

14. The combination with a key-controlled vending machine adapted to hold a plurality of articles to be successively vended, of a key therefor, and indicating mechanism associated with the key.

15. The combination with a key-controlled vending machine having a key opening requiring the use of a relatively large key, of an elongated key, and indicating mechanism associated with the key.

16. A vending machine, comprising key-controlled mechanism for successively vending articles, a counter upon which said mechanism is positioned, a key for actuating said mechanism as long as one of the dimensions of said counter, the counter having a key opening to receive said key.

In testimony whereof I affix my signature, in presence of a witness.

JUDSON B. HURD.

Witness:
FRANCIS S. MAGUIRE.

Copies of this patent may be obtained for five cents each, by addressing the "Commissioner of Patents, Washington, D. C."